April 9, 1929.  S. H. KAUFMANN  1,708,795
EMBOSSING MACHINE
Filed Jan. 19, 1928   2 Sheets-Sheet 1
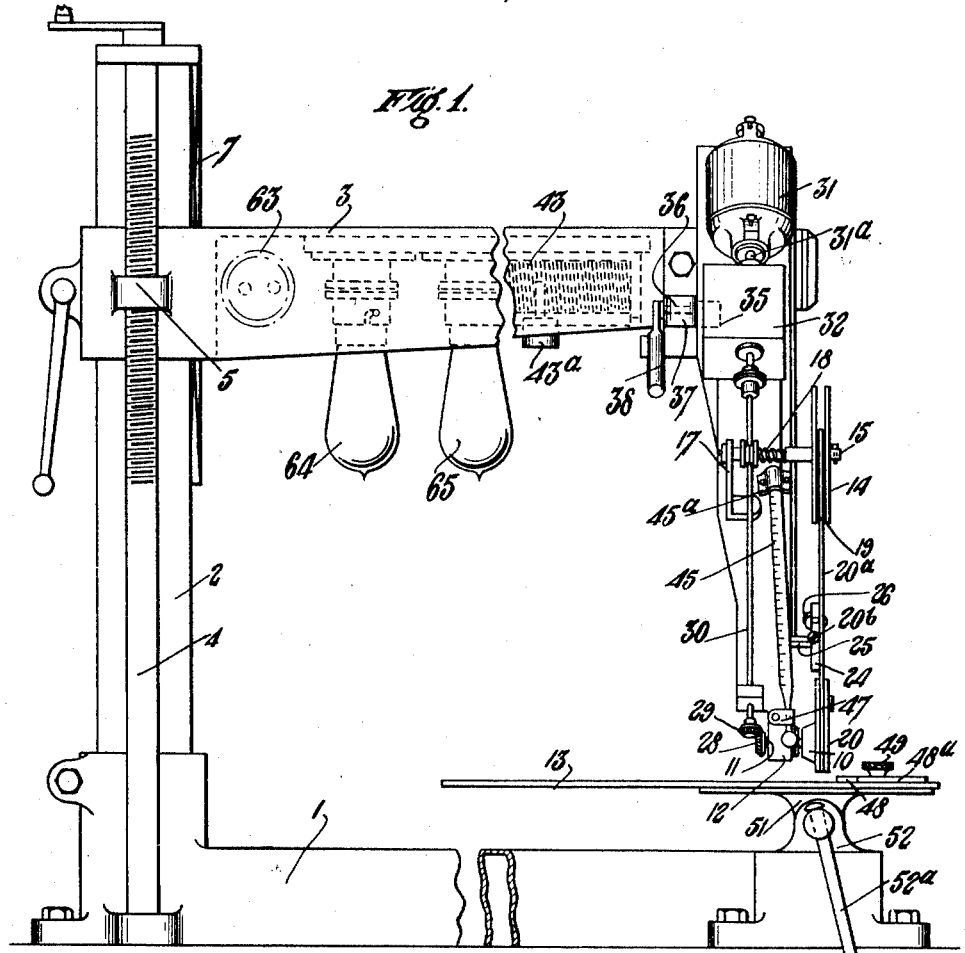
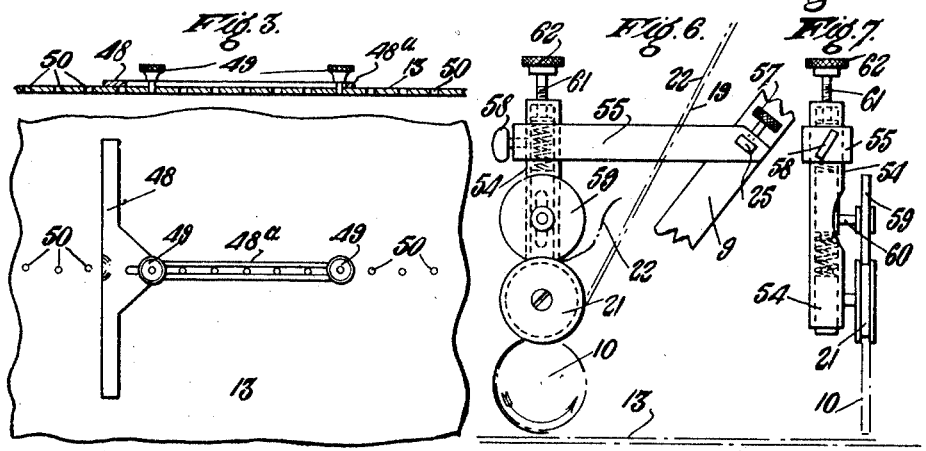
INVENTOR:—
SIEGFRIED HENRY KAUFMANN.
PER:—
ATTORNEYS.

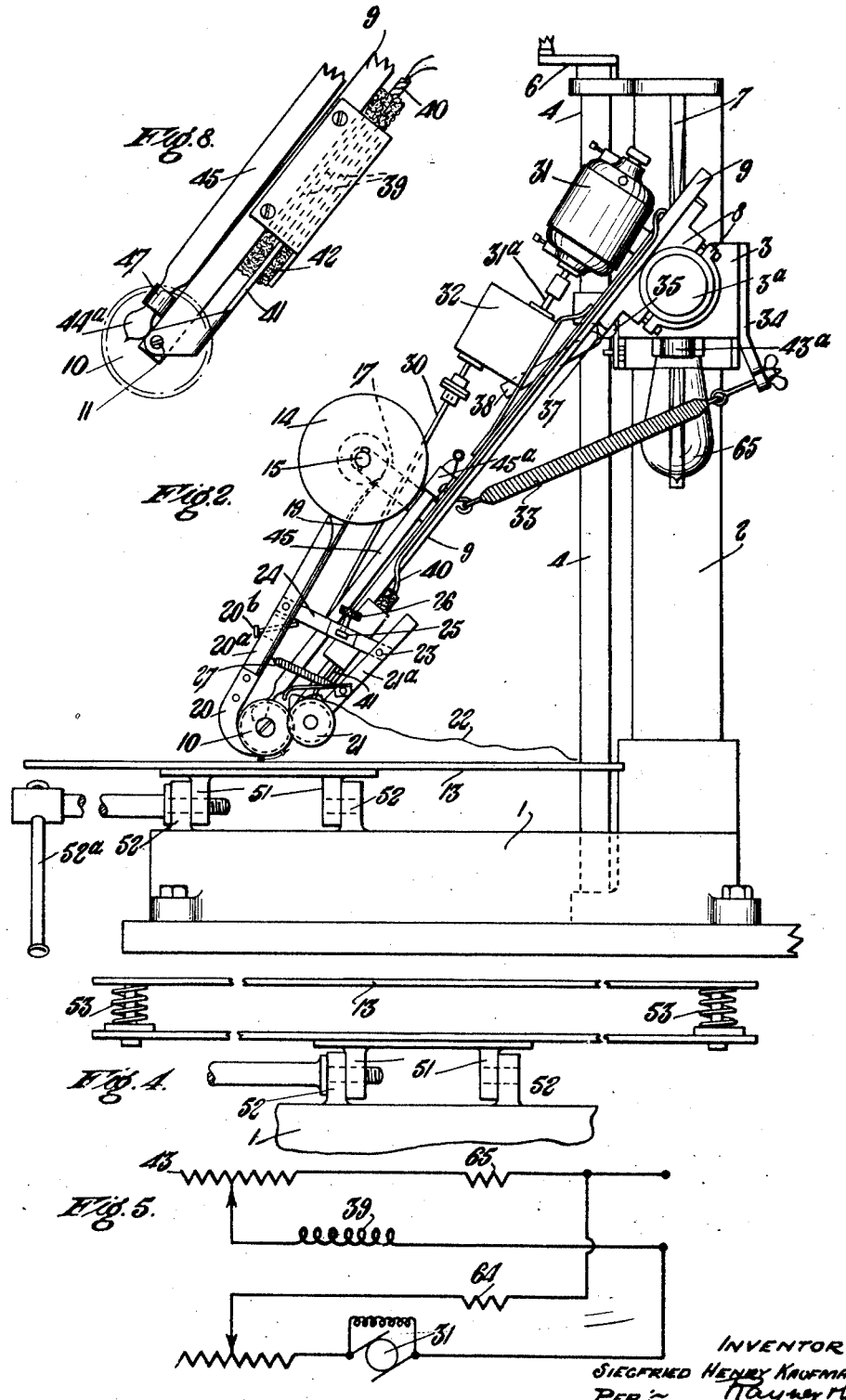

Patented Apr. 9, 1929.

1,708,795

UNITED STATES PATENT OFFICE.

SIEGFRIED HENRY KAUFMANN, OF LONDON, ENGLAND.

EMBOSSING MACHINE.

Application filed January 19, 1928, Serial No. 247,977, and in Great Britain June 14, 1927.

The object of the present invention is to provide a machine for speeding up and improving embossing and like operations as applied to leather and other goods or materials in which gilt and other patterns are applied to the goods or materials in foil or strip form.

According to my invention an embossing machine consists of a support for the foil and means for feeding the foil to an embossing tool between which and a supporting surface the article to be embossed is adapted to be placed, means being provided for varying the space between the embossing tool and the said supporting surface, for instance by adjusting the embossing tool towards and away from the supporting surface, and means for pressing the article to be embossed between the supporting surface and the embossing tool.

The preferred embodiment of my invention comprises a suitable base having a pillar thereon and a horizontally extended arm slidably mounted upon the pillar so that it can be adjustably affixed thereto in any required position.

At the free end of this horizontally fixed arm is mounted one end of a downwardly extending arm carrying at its free end an embossing wheel so that it rests freely on a platform which is secured to the extended base of the machine.

This downwardly extending arm is arranged at any required angle and is provided at the lower and free end with a cylindrical embossing die or wheel which is suitably mounted so as to rotate and bear upon the work passing between its periphery and the platform below. This rotatable cylindrical die or wheel is engraved upon its edges with the desired pattern to be impressed upon the work, and is heated by an electric heating device adapted to be connected to a source of current so as to constantly maintain the surface of the die at a required temperature.

The embossing cylindrical die or wheel is rotated by a small electric motor situated near the top of the downwardly depending arm and the power is transmitted from the motor to the embossing wheel through suitable gearing in any well known manner.

From near the free end of the horizontally mounted arm depends the arm carrying at its lower and free end the embossing tool, and also carrying the said electric motor and the heating device both preferably being connected to the same source of current, suitable resistances being introduced where necessary. A spring acts upon this depending arm so as to tend to press its lower end toward the supporting surface for the articles to be embossed.

The platform upon which the work travels beneath the embossing wheel may be pivotally arranged to move slightly up and down out of the horizontal to provide for various configurations of articles to be embossed, or a free running plain surface wheel may take the place of the platform.

Spools for metallic foils or films and one or more suitable feeding rollers are provided to carry onto the embossing wheel the continuous strips of foil which may be composed of a suitable backing and gold foil or other suitable materials. This may be provided with a sized surface so that the foil or the like will adhere to the article or material being embossed.

The rotating die which is readily removed and replaced by others will be pressed upon the surface of the work with sufficient force to produce a clear impression of the pattern on the surface of the leather or the like and will at the same time cause the gold or other foil to be forced into the impressed pattern so as to adhere therein.

In order that my invention may be clearly understood and readily carried into effect, I have appended hereto two sheets of drawings illustrating an embodiment of same and a slight modification.

In the drawings:—

Fig. 1 is a front elevation.

Fig. 2 is a side elevation.

Fig. 3 is a detail figure showing in section and plan the adjustable guide for articles to be embossed.

Fig. 4 is a detail view showing a resiliently mounted supporting surface.

Fig. 5 is a diagrammatic view of the various electrical elements.

Fig. 6 is a detail side elevation showing a modified method of conveying the foil to the embossing member.

Fig. 7 is a front elevation of Fig. 6, and

Fig. 8 is a detail view of the means for heating embossing tool.

Referring to the drawings the machine is mounted upon a base 1 provided with an upstanding pillar 2 upon which is slidable up and down a horizontal arm 3, a feed screw 4 threaded through a lug 5 on the end of the arm 3 providing the requisite traversing mechanism for raising or lowering the arm 3, any suitable means, for instance a handle 6, being provided for rotating the screw 4. A feather 7 engaging in the end of the arm 3 prevents oscillation of the arm.

The free end of the arm 3 is formed with a cylindrical portion 3$^a$ about which is engaged a clamp 8 part of which is secured to the upper end of an arm 9 which carries the embossing tool at its lower end. The embossing tool is a cylindrical member 10 mounted on a spindle 11 supported in a bearing 12 at the lower end of the arm 9. The embossing tool 10 is adapted to have the strip foil fed over it so that the foil passes between the embossing tool 10 and a supporting plate 13 for the articles to be embossed. The supply of foil is carried by a spool 14 detachably mounted on a pin 15 extending laterally from a bracket 17 secured to the arm 9. A coiled spring 18 on the pin 15 abuts against the hub of the spool 14 to prevent the spool from rotating freely in order to ensure that the strip foil 19 will be maintained taut as it travels over the embossing tool 10.

The foil 19 is passed from the spool 14 between a guide 20 and the embossing roller 10, the foil passing partially around the periphery of the embossing roller so as to be pressed against the article to be embossed. The usual backing 22 for the foil is carried from the embossing roller over a take-off roller 21 from whence the backing can be collected. The roller 21 is carried by the lower end of an arm 21$^a$ which is pivotally supported adjacent its upper end by a pin 23 carried by one end of a bar 24 which has at its centre a square hole whereby it is engaged over a square pin 25 projecting laterally from the arm 9, a set screw 26 holding the bar against movement relative to the arm 9. The other end of this bar 24 carries in a manner similar to the arm 21$^a$, an arm 20$^a$ carrying at its lower end the foil guide 20. The two arms 20$^a$ and 21$^a$ are connected to each other beneath the bar 24 by a tension spring 27 whereby the guide 20 and the take-off roller 21 are maintained pressed against the embossing roller 10. The periphery of the roller 21 is preferably channelled to ensure a proper guiding of the backing 22 from the embossing roller 10. To prevent undue pressure of the guide 20 against the embossing roller 10 a screw 20$^b$ is threaded through the arm 20$^a$ and abuts against the bar 24, thereby providing an adjustment for the guide 20 relative to the embossing roller 10.

The requisite rotation is imparted to the embossing roller by mounting on the spindle 11 a bevel gear wheel 28 with which meshes a like wheel 29 fixed to the lower end of a spindle 30 driven from an electric motor 31 mounted on the upper end of the arm 9. The spindle 30 is driven at a reduced speed relative to the shaft 31$^a$ of the motor by introducing a reduction gear between the motor shaft 31$^a$ and the spindle 30, the reduction gear preferably being accommodated in a housing 32. The requisite pressure of the embossing roller 10 on the article being embossed can be obtained in a resilient manner to allow for irregularities of the articles, by means of a strong tension spring 33 connected to a convenient part of the arm 9 and a bracket 34 secured to the horizontal arm 3. The arm 9 can be raised against the influence of the spring 33 by means of a cam 35 carried by a pin 36 extending through a lug 37 on the arm 3, a handle 38 enabling the pin to be rotated so that the periphery of the cam 35 presses against the arm 9 and moves it slightly upwards.

As is well known embossing foil is generally mounted on paper, being the backing 22, and it is desirable to heat the roller 10 in order to melt the size provided on the surface of the foil and which causes it to adhere to the article to be embossed. A convenient method of effecting this is by utilizing the same source of current employed for the electric motor 31 for conveying current to a resistance element 39, the flex for this purpose being indicated by the reference numeral 40. A strip of metal 41 of good heat conductivity is surrounded by heat resistant material 42 (see Fig. 8) and is provided with a boss surrounding the spindle 11 and projecting into a recess in the embossing roller, so as to conduct the heat thereto. To enable the operator to regulate the heat of the embossing roller, a variable resistance 43 which can be a slider coil carried in the arm 3 as shown in Fig. 2, is provided, a slider knob 43$^a$ enabling the operator to readily regulate the heat. The temperature of the embossing roller can be approximately ascertained by engaging the bulb 44$^a$ of a thermometer 45 with the boss on the strip 41, one end of the thermometer being supported in a bracket 45$^a$ secured to the arm 9, and the lower end of the thermometer being engaged in a bracket 47.

The articles to be embossed can be guided along the plate 13 in the desired path against a guide bar 48 (see Fig. 3) which has a lateral limb 48$^a$, giving it a T configuration. The limb 48$^a$ is slotted to receive a pair of screws 49 which are inserted in a selected pair of a number of holes 50 in the plate 13. The bar 48 may be arcuate, or other configuration according to the path the embossing has to take.

To enable boxes and other articles which have inclined surfaces to be embossed the plate 13 can be angularly adjustable by supporting it on pivot pins passed through lugs 51 and 52 on the plate 13 and base 1 respectively. One of these pins is threaded and extended to receive a turning handle 52$^a$ whereby sufficient friction can be obtained to hold the plate 13 in selected position.

As an alternative, or addition, to the spring 33, the plate 13 can be mounted upon a number of compression springs 53 (see Fig. 4) to press the articles against the embossing tool.

In Figs. 6 and 7 is shown a modified arrangement of take-off roller 21. In this arrangement the take-off roller 21 is carried by the lower end of a sleeve 54 which is adjustable vertically through an arm 55 which is secured to the arm 9 by engaging a square hole in the arm 55 over the projection 25 carried by the arm 9, a set screw 57 holding the arm 55 in position, and a set screw 58 holding the sleeve 54 in selected position. The foil 19 and backing 22 are carried between the rollers 21 and 10. An idler roller 59 is disposed just above the roller 21 and rotatable on a pin 60 which is fixed to a rod slidable but not rotatable in the sleeve 54. This rod is spring mounted and adjustable by a feed screw 61 rotatable by means of a milled head 62. This enables the roller 21 to press resiliently on the embossing roller 10 and the roller 59 to engage the roller 21 to convey away the paper backing.

A "plug-in" electric connector 63 can be carried by the arm 3 to enable the motor 31 and heater 39 to be connected to an available source of current, a fixed resistance 64 and another 65 being provided for the motor and heater circuits when necessary. The motor resistance and control switch is preferably arranged to be foot controlled so as to leave the operator's hands free for manipulation of the article to be embossed.

I claim:—

1. In an embossing machine, a rotary embossing tool, a supporting arm on which the tool is mounted, an electric motor mounted on the arm for rotating the tool at the desired speed, electrical heating means for keeping the tool at the correct working temperature and means for exerting a resilient pressure between the rotary tool and the work.

2. In an embossing machine, a rotary embossing tool, a supporting arm on which the tool is mounted, an electric motor mounted on the arm for rotating the tool at the desired speed, a support for a spool of foil and means for feeding the foil automatically to the periphery of the tool, electrical heating means for keeping the tool at the correct working temperature and means for exerting a resilient pressure between the rotary tool and the work.

3. In an embossing machine, a rotary embossing tool, a supporting arm on which the tool is mounted, an electric motor mounted on the arm for rotating the tool at the desired speed, a support for a spool of foil and means for feeding the foil automatically to the periphery of the tool, electrical heating means for keeping the tool at the correct working temperature, means for exerting a resilient pressure between the rotary tool and the work, and a foot operated switch for regulating and controlling the electric motor.

4. In an embossing machine, a rotary embossing tool, a supporting arm on which the tool is mounted, an electric motor mounted on the arm for rotating the tool at the desired speed, a support for a spool of foil and means for feeding the foil automatically to the periphery of the tool, electrical heating means for keeping the tool at the correct working temperature, means for exerting a resilient pressure between the rotary tool and the work, and a foot operated switch for regulating and controlling the electric motor.

5. In an embossing machine, a base, a vertical guide thereon, a fixed arm mounted on the guide, means for raising and lowering the arm, a depending arm mounted on the fixed arm, a rotary embossing tool arranged at the free end of the depending arm, an electric motor on the arm, gearing and a shaft for transmitting the drive to the embossing tool, a supporting table for the work on the base of the machine and means for exerting a resilient pressure between the embossing tool and the work on the table.

6. In an embossing machine, a base, a vertical guide thereon, a fixed arm mounted on the guide, means for raising and lowering the arm, a depending arm mounted on the fixed arm, a rotary embossing tool arranged at the free end of the depending arm, an electric motor on the arm, gearing and a shaft for transmitting the drive to the embossing tool, a supporting table for the work on the base of the machine, means for exerting a resilient pressure between the embossing tool and the work on the table, a support for a spool of foil, guides to conduct the foil to the periphery of the embossing tool and an electric heating element arranged on the depending arm and communicating its heat to the embossing tool through a conductor having a projection engaging in a recessed boss on the tool.

7. In an embossing machine, a base, a vertical guide thereon, a fixed arm mounted on the guide, means for raising and lowering the arm, a depending arm mounted on the fixed arm, a rotary embossing tool arranged at the free end of the depending arm, an electric motor on the arm, gearing and a shaft for transmitting the drive to the embossing tool, a supporting table for the work on the base of the machine, means for exerting a resilient pressure between the embossing tool and the work on the table, and a foot operated switch for controlling the electric motor.

8. In an embossing machine, a base, a vertical guide thereon, a fixed arm mounted on the guide, means for raising and lowering the arm, a depending arm mounted on the fixed arm, a rotary embossing tool arranged at the free end of the depending arm, an electric motor on the arm, gearing and a shaft for transmitting the drive to the embossing tool, a supporting table for the work on the base of the machine, means for exerting a resilient pressure between the embossing tool and the work on the table, a support for a spool of foil, guides to conduct the foil to the periphery of the embossing tool, an electric heating element arranged on the depending arm and communicating its heat to the embossing tool through a conductor having a projection engaging in a recessed boss on the tool, and a foot operated switch for controlling the electric motor.

9. In an embossing machine, a base, a vertical guide thereon, a fixed arm mounted on the guide, means for raising and lowering the arm, a depending arm mounted on the fixed arm, a rotary embossing tool arranged at the free end of the depending arm, an electric motor or the arm, gearing and a shaft for transmitting the drive to the embossing tool, a supporting table for the work on the base of the machine, means for exerting a resilient pressure between the embossing tool and the work on the table, a foot operated switch for controlling the electric motor, a variable resistance in the circuit of the heating element and a thermometer adjacent the embossing tool to indicate the temperature thereof.

10. In an embossing machine, a base, a vertical guide thereon, a fixed arm mounted on the guide, means for raising and lowering the arm, a depending arm mounted on the fixed arm, a rotary embossing tool arranged at the free end of the depending arm, an electric motor on the arm, gearing and a shaft for transmitting the drive to the embossing tool, a supporting table for the work on the base of the machine, means for exerting a resilient pressure between the embossing tool and the work on the table, a support for a spool of foil, guides to conduct the foil to the periphery of the embossing tool, an electric heating element arranged on the depending arm and communicating its heat to the embossing tool through a conductor having a projection engaging in a recessed boss on the tool, a foot operated switch for controlling the electric motor, a variable resistance in the circuit of the heating element and a thermometer adjacent the embossing tool to indicate the temperature thereof.

11. A machine for embossing leather and other like materials comprising a supporting surface for articles to be embossed, a support for an arm, means for moving the said support towards and away from the supporting surface, a rotary spindle at the lower end of said arm connected for rotation to an electric motor, an electrical heating device adjacent said spindle, a take-off roller located so as to contact with the periphery of the embossing tool, a guide for the foil located so as to be close to the embossing tool, spring means for urging the said take-off roller and the guide towards the embossing tool, and means for regulating the temperature of the embossing tool.

12. A machine for embossing leather and other like materials comprising a supporting surface for articles to be embossed, a support for an arm, means for moving the said support towards and away from the supporting surface, a rotary spindle at the lower end of said arm connected for rotation to an electric motor, an electrical heating device adjacent said spindle, a take-off roller located so as to contact with the periphery of the embossing tool, a guide for the foil located so as to be close to the embossing tool, spring means for urging the said take-off roller and the guide towards the embossing tool, means for regulating the temperature of the embossing tool, and a take-off roller for withdrawing the foil backing, located close to the embossing tool and adjustable relatively thereto.

13. In an embossing machine, a base, a vertical guide thereon, a fixed laterally extending arm mounted thereon, screw means for raising and lowering said arm on its guide, a downwardly depending arm mounted to swivel about the end of the fixed arm, a table for the work located below the end of the downwardly depending arm, a spring acting to urge the end of the arm toward the table, a rotary embossing tool mounted at the lower end of the depending arm, an electric motor mounted on this arm, gearing and a shaft for driving the embossing tool from the motor, an electric heating element mounted on the arm, a strip of conducting material extending from the element close to the embossing tool, a projecting boss on the strip engaging in a recess in one face of the tool and means for controlling the temperature of the tool and the operation of the electric motor.

14. In an embossing machine, a base, a vertical guide thereon, a fixed laterally extending arm mounted thereon, screw means for raising and lowering said arm on its guide, a downwardly depending arm mounted to swivel about the end of the fixed arm, a table for the work located below the end of the downwardly depending arm, a spring acting to urge the end of the arm toward the table, a rotary embossing tool, mounted at the lower end of the depending arm, an electric motor mounted on this arm, gearing and a shaft for driving the embossing tool from the motor, an electric heating element mounted on the arm, a strip of conducting material extending from the element close to the embossing tool, a projecting boss on the strip engaging in a recess in one face of the tool, a variable resistance and a thermometer for regulating and indicating the temperature of the embossing tool and a foot operated switch for controlling the electric motor.

15. In an embossing machine, a base, a vertical guide thereon, a fixed laterally extending arm mounted thereon, screw means for raising and lowering said arm on its guide, a downwardly depending arm mounted to swivel about the end of the fixed arm, a table for the work, located below the end of the downwardly depending arm, a spring acting to urge the end of the arm toward the table, a rotary embossing tool mounted at the lower end of the depending arm, an electric motor mounted on this arm, gearing and a shaft for driving the embossing tool from the motor, an electric heating element mounted on the arm, a strip of conducting material extending from the element close to the embossing tool, a projecting boss on the strip engaging in a recess in one face of the tool, means for controlling the temperature of the tool and the operation of the electric motor, a support for a spool of foil, a guide for conducting the foil to the periphery of the embossing tool, a take-off roller adjustably mounted close to the embossing tool for removing the foil backing.

16. In an embossing machine, a base, a vertical guide thereon, a fixed laterally extending arm mounted thereon, screw means for raising and lowering said arm on its guide, a downwardly depending arm mounted to swivel about the end of the fixed arm, a table for the work located below the end of the downwardly depending arm, a spring acting to urge the end of the arm toward the table, a rotary embossing tool, mounted at the lower end of the depending arm, an electric motor mounted on this arm, gearing and a shaft for driving the embossing tool from the motor, an electric heating element mounted on the arm, a strip of conducting material extending from the element close to the embossing tool, a projecting boss on the strip engaging in a recess in one face of the tool, a variable resistance and a thermometer for regulating and indicating the temperature of the embossing tool, a foot operated switch for controlling the electric motor, a support for a spool of foil, a guide for conducting the foil to the periphery of the embossing tool, and a take-off roller adjustably mounted close to the embossing tool for removing the foil backing.

17. In an embossing machine, a support for the work, an embossing tool, a support for said embossing tool movable away from and towards said work support, means for continuously feeding foil to said embossing tool, means for adjusting said tool support towards and away from said work support and for fixing the same in adjusted position, means for exerting a resilient pressure between said tool and the work on said work support and means for guiding the work on said support.

18. In an embossing machine, an adjustable table, a tool support adjustable towards and away from said table, an embossing tool carried by said support, means for continuously feeding foil to said embossing tool and means for exerting a resilient pressure between said embossing tool and the work on said table.

SIEGFRIED HENRY KAUFMANN.